(12) United States Patent
Kwon et al.

(10) Patent No.: US 12,327,381 B2
(45) Date of Patent: Jun. 10, 2025

(54) METHOD AND APPARATUS FOR COMPRESSING POINT CLOUD DATA

(71) Applicant: Electronics and Telecommunications Research Institute, Daejeon (KR)

(72) Inventors: Hyuk-Min Kwon, Daejeon (KR); Jin-Young Lee, Daejeon (KR); Kyu-Heon Kim, Daejeon (KR); Jun-Sik Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 290 days.

(21) Appl. No.: 17/857,637

(22) Filed: Jul. 5, 2022

(65) Prior Publication Data

US 2023/0010407 A1 Jan. 12, 2023

(51) Int. Cl.
*G06T 9/00* (2006.01)
(52) U.S. Cl.
CPC .................... *G06T 9/001* (2013.01)
(58) Field of Classification Search
CPC .......... G06T 9/001; G06T 9/004; G06T 7/20; G06T 7/215; H04N 19/527; H04N 19/124; H04N 19/51; H04N 19/513; H04N 19/13
USPC ....................................................... 382/232
See application file for complete search history.

(56) References Cited

U.S. PATENT DOCUMENTS

| | | | |
|---|---|---|---|
| 10,360,469 | B2 | 7/2019 | Feng et al. |
| 11,361,471 | B2 | 6/2022 | Mammou et al. |
| 2021/0248815 | A1 | 8/2021 | Kim et al. |
| 2021/0327097 | A1* | 10/2021 | Ramasubramonian ...................... H04N 19/90 |
| 2021/0407145 | A1 | 12/2021 | Chang et al. |
| 2022/0108487 | A1* | 4/2022 | Cao ...................... H04N 19/597 |
| 2022/0124374 | A1 | 4/2022 | Zhang et al. |
| 2024/0251097 | A1* | 7/2024 | Pham Van ................ G06T 9/40 |

FOREIGN PATENT DOCUMENTS

| | | |
|---|---|---|
| KR | 10-2016-0088226 A | 7/2016 |
| KR | 10-2016-0149848 A | 12/2016 |
| KR | 10-2020-0038534 A | 4/2020 |
| KR | 10-2206108 B1 | 1/2021 |

(Continued)

OTHER PUBLICATIONS

J. Jin, G. Li, Y. Shao, F. Song and R. Zhang, "An Improved Coarse-To-Fine Motion Estimation Scheme For Lidar Point Cloud Geometry Compression," 2021 IEEE International Conference on Multimedia & Expo Workshops (ICMEW), Shenzhen, China, 2021 , pp. 1-6 (Year: 2021).*

(Continued)

*Primary Examiner* — Chineyere Wills-Burns
*Assistant Examiner* — Emmanuel Silva-Avina
(74) *Attorney, Agent, or Firm* — KILE PARK REED & HOUTTEMAN PLLC (57) ABSTRACT

Disclosed herein is a method for compressing point cloud data. The method includes quantizing input point cloud data, generating a global motion matrix based on the quantized point cloud data, applying the global motion matrix based on whether local motion compression is performed, and compressing data to which the global motion matrix is applied.

14 Claims, 4 Drawing Sheets

(56) References Cited

FOREIGN PATENT DOCUMENTS

KR    10-2022-0029595 A    3/2022
KR    10-2023-0081703      6/2023

OTHER PUBLICATIONS

De Queiroz, Ricardo L., and Philip A. Chou. "Motion-compensated compression of dynamic voxelized point clouds." IEEE Transactions on Image Processing 26.8 (2017): 3886-3895. (Year: 2017).*
De Queiroz, Ricardo L., and Philip A. Chou. "Transform coding for point clouds using a Gaussian process model." IEEE Transactions on Image Processing 26.7 (2017): 3507-3517. (Year: 2017).*
J. Kim, et al., [GPCC][New Proposal] A method of applying the global motion matrix according to the compression condition. ISO/IEC JTC/SC29/WG7 m57484 Ver.1, Jul. 7, 2021.
Hyejung Hur., [G-PCC][EE13.2 related] on Global Motion Estimation and Compensation. ISO/IEC JTC 1/SC 29/WG 7 m57316, Jul. 2021.
Luong Pham Van et al., [G-PCC] EE13.2 Test 1.1: Global motion using two-threshold classification. ISO/IEC JTC 1/SC 29/WG 7 m56818_v1, Apr. 2021.
Luong Pham Van et al., [G-PCC][EE13.2 related][New Proposal] Improved global motion estimation for G-PCC. ISO/IEC JTC 1/SC 29/WG 7 m56113_v3, Jan. 2021.

* cited by examiner

METHOD AND APPARATUS FOR COMPRESSING POINT CLOUD DATA

CROSS REFERENCE TO RELATED APPLICATIONS

This application claims the benefit of Korean Patent Application No. 10-2021-0089359, filed Jul. 7, 2021, and No. 10-2022-0067566, filed Jun. 2, 2022, which are hereby incorporated by reference in their entireties into this application.

BACKGROUND OF THE INVENTION

1. Technical Field

The present invention relates generally to a method for searching for global motion between quantized point cloud frames and technology for applying a global motion matrix for 3D global motion acquired through the search to a point cloud in order to compress point cloud frames.

More particularly, the present invention relates to technology for deciding on a global motion matrix application method based on whether local motion is compressed in order to improve the efficiency of compression of point cloud frames.

2. Description of the Related Art

A point cloud is a set of points when 3D content is represented using a large number of points, and each point in a point cloud is configured with position information represented as x, y, and z coordinates, reflectance at the corresponding position, and RGB attributes. Point clouds are acquired using a Light Detection And Ranging (LiDAR) sensor or a fixed RGB camera set, and point cloud content is advantageous in processing an actual object compared to a polygon-based mesh method, which is used to process a virtual 3D object. Due to these characteristics, the use of a point cloud is attracting a lot of attention as a next-generation 3D content presentation method in various fields such as autonomous driving, augmented reality, virtual reality, and the like.

The Moving Picture Expert Group (MPEG) of ISO/IEC JTC1, which is an international standardization organization, classifies point cloud content into three categories, namely category 1, category 2, and category 3, depending on compression characteristics, and is separately working on standardization of Geometry-based Point Cloud Compression (G-PCC) and Video-based Point Cloud Compression (V-PCC). G-PCC is designed for content of category 1, referred to as static point clouds, which represent objects that do not change over time, and content of category 3, referred to as dynamically acquired point clouds, which are acquired using a LiDAR sensor. Here, a dynamically acquired point cloud acquired using a LiDAR sensor may be expressed as a single piece of data representing a huge scene, or may alternatively be expressed as consecutive frames along a time axis. Huge scene data is generated by combining point clouds acquired using a LiDAR sensor at a specific time, and time information of each frame is ignored. Accordingly, it is difficult to recognize an object moving along a time axis in the huge scene data, and it is required to process a LiDAR-based point cloud in units of frames in order to maintain time information. Because a LiDAR-based point cloud in units of frames has high correlation between frames, high compression efficiency may be achieved using an interframe prediction method, and to this end, G-PCC of MPEG is working on standardization of Inter-Exploratory Model (Inter-EM). Points of a LiDAR-based point cloud exhibit two types of motion, namely global motion caused by movement of a vehicle in which a LiDAR sensor is installed and local motion caused by movement of objects, such as people, animals and the like, over time. Particularly, Inter-EM is designed to have a structure for performing compression in consideration of both global motion and local motion in order to efficiently compress characteristics of a LiDAR-based point cloud.

DOCUMENTS OF RELATED ART (Patent Document 1) Korean Patent Application Publication No. 10-2022-0029595, titled "Point cloud encoding and decoding method, encoder, decoder, and computer storage medium".

SUMMARY OF THE INVENTION

An object of the present invention is to effectively compress point cloud content by changing a global motion matrix application method depending on whether local motion compression is used.

Another object of the present invention is to provide a global motion search method and a global motion matrix generation method that are suitable for a quantized point cloud.

In order to accomplish the above objects, a method for compressing point cloud data according to an embodiment of the present invention includes quantizing input point cloud data, generating a global motion matrix based on the quantized point cloud data, applying the global motion matrix based on whether local motion compression is performed, and compressing data to which the global motion matrix is applied.

Here, generating the global motion matrix may include correcting the global motion matrix based on the quantization coefficient applied to the input point cloud data.

Here, applying the global motion matrix may comprise, when local motion compression is performed, applying the global motion matrix to all of the input point cloud data.

Here, applying the global motion matrix may comprise, when local motion compression is not performed, applying the global motion matrix to points in the input point cloud data differently depending on whether global motion characteristics are present.

Here, applying the global motion matrix may comprise applying the global motion matrix to points in which global motion characteristics are present in the input point cloud data.

Here, correcting the global motion matrix may comprise correcting the global motion matrix using the quantization coefficient and a correction coefficient.

Here, the correction coefficient may be set differently depending on the value of the global motion matrix.

Here, compressing the data may include performing local motion compression, geometric compression, and arithmetic compression.

Also, in order to accomplish the above objects, an apparatus for compressing point cloud data according to an embodiment of the present invention includes memory in which at least one program is recorded and a processor for executing the program. The program includes instructions for performing the steps of quantizing input point cloud data, generating a global motion matrix based on the quantized point cloud data, applying the global motion matrix based on whether local motion compression is performed, and compressing data to which the global motion matrix is applied.

Here, generating the global motion matrix may include correcting the global motion matrix based on the quantization coefficient applied to the input point cloud data.

Here, applying the global motion matrix may comprise, when local motion compression is performed, applying the global motion matrix to all of the input point cloud data.

Here, applying the global motion matrix may comprise, when local motion compression is not performed, applying the global motion matrix to points in the input point cloud data differently depending on whether global motion characteristics are present.

Here, applying the global motion matrix may comprise applying the global motion matrix to points in which global motion characteristics are present in the input point cloud data.

Here, correcting the global motion matrix may comprise correcting the global motion matrix using the quantization coefficient and a correction coefficient.

Here, the correction coefficient may be set differently depending on the value of the global motion matrix.

Here, compressing the data may include performing local motion compression, geometric compression, and arithmetic compression.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

When global motion is searched for in a quantized point cloud, there is a problem in that the found global motion matrix has low accuracy. Accordingly, a compression method suitable for a global motion matrix generated in a quantized point cloud is required. Conventional technology for applying a global motion matrix does not take into consideration whether local motion compression is used, so it cannot achieve optimal compression efficiency. Therefore, compression technology that changes the global motion matrix application method depending on whether local motion compression is used is required for efficient compression. Accordingly, the present invention presents a motion search method suitable for a global motion matrix acquired in a quantized point cloud, a method for generating a motion search matrix, and a global motion matrix application method that takes into consideration whether local motion compression is used.

Hereinafter, global motion in the present specification may be motion caused by movement of a vehicle in which a LiDAR sensor for acquiring point cloud data is installed, but this is merely an example, and the scope of the present invention is not limited thereto.

Also, local motion in the present specification may be motion by objects that move, such as people, animals, and the like, but the scope of the present invention is not limited thereto.

Figure 1:
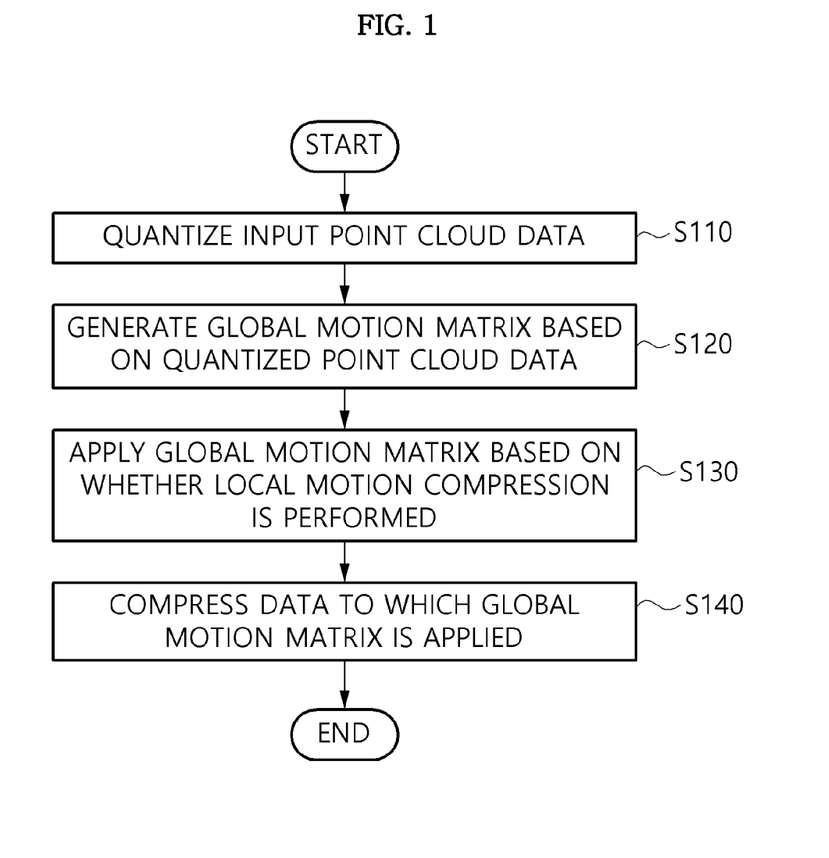
FIG. 1 is a flowchart illustrating a method for compressing point cloud data according to an embodiment of the present invention.

FIG. 1 is a flowchart illustrating a method for compressing point cloud data according to an embodiment of the present invention.

The method for compressing point cloud data according to an embodiment of the present invention may be performed in an apparatus for compressing point cloud data, such as a computing device.

Referring to FIG. 1, the method for compressing point cloud data according to an embodiment includes quantizing input point cloud data at step S110, generating a global motion matrix based on the quantized point cloud data at step S120, applying the global motion matrix based on whether local motion compression is performed at step S130, and compressing data to which the global motion matrix is applied at step S140.

Here, at the step (S120) of generating a global motion matrix, a global motion matrix may be generated using an Iterative Closest Point (ICP) method, a point cloud segmentation global motion search method, and the like.

Here, generating a global motion matrix at step S120 may include correcting the global motion matrix based on the quantization coefficient applied to the input point cloud data.

Here, correcting the global motion matrix may be performed as shown in Equation (1) below:

$$GM'=\text{round}(GM*2^{bits}*qs*\delta)/(2^{bits}*qs*\delta) \qquad (1)$$

In Equation (1) above, GM' denotes a corrected global motion matrix, GM denotes a global motion matrix before correction, bits denotes the number of bits used for compression, qs denotes a quantization coefficient, and δ denotes a correction coefficient.

Here, at the step (S130) of applying the global motion matrix, when local motion compression is performed, the global motion matrix may be applied to all of the input point cloud data.

Here, at the step (S130) of applying the global motion matrix, when local motion compression is not performed, the global motion matrix may be applied to points in the input point cloud data differently depending on whether global motion characteristics are present.

Here, at the step (S130) of applying the global motion matrix, the global motion matrix may be applied to points in which global motion characteristics are present in the input point cloud data.

Here, at the step of correcting the global motion matrix, the global motion matrix may be corrected using the quantization coefficient and the correction coefficient.

Here, the correction coefficient may be set differently depending on the value of the global motion matrix.

Here, compressing the data at step S140 may include local motion compression, geometric compression, and arithmetic compression.

Figure 2:
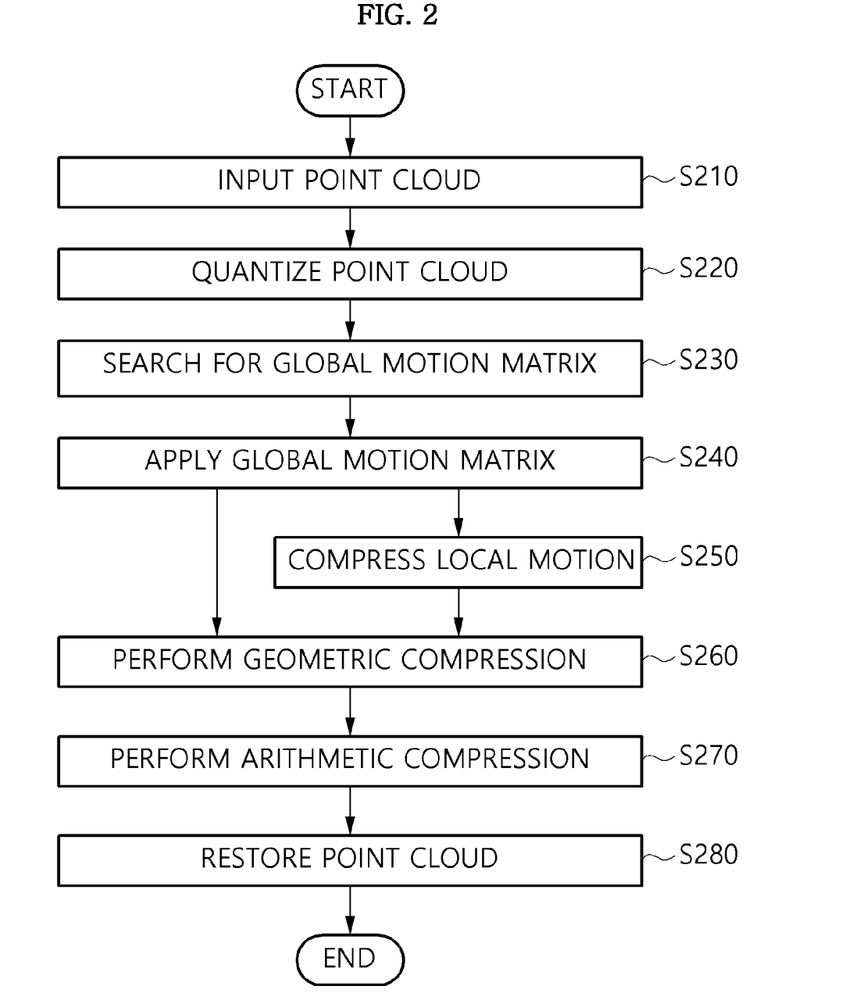
FIG. 2 is a flowchart illustrating in detail a method for compressing point cloud data according to an embodiment of the present invention.

FIG. 2 is a flowchart illustrating in detail a method for compressing point cloud data according to an embodiment of the present invention.

Referring to FIG. 2, the method according to an embodiment of the present invention may include inputting a point cloud at step S210, quantizing the point cloud at step S220, searching for a global motion matrix at step S230, applying the global motion matrix at step S240, compressing local motion at step S250, performing geometric compression at step S260, performing arithmetic compression at step S270, and restoring a point cloud at step S280.

Among the steps illustrated in FIG. 2, compressing local motion at step S250, performing geometric compression at step S260, performing arithmetic compression at step S270, and restoring a point cloud at step S280 may be performed using the conventional G-PCC Inter-EM and point-cloud-based motion compression techniques.

At the step (S210) of inputting a point cloud image, a series of 3D still images composed of a point cloud is input. Here, each of the input still images may be data composed of a point cloud.

At the step (S220) of quantizing the point cloud, the point cloud is quantized in order to determine compression efficiency depending on characteristics such as the size, density, and the like of the input point cloud. The point cloud may be quantized by performing scale conversion and rounding to integers.

At the step (S230) of searching for and generating a global motion matrix, global motion occurring between point cloud frames is searched for, and a global motion matrix is generated. In order to search for global motion, an Iterative Closest Point (ICP) method, a point cloud segmentation global motion search method, and the like, which are conventional techniques, may be used.

Here, if the point cloud used to search for global motion is in a quantized state, there is a problem in which the acquired global motion matrix cannot accurately express the actual motion of the point cloud. Therefore, a method for generating a global motion matrix that takes into consideration a quantized point cloud is required.

Generation of a global motion matrix based on a quantization coefficient may be performed as a method for generating a global motion matrix in consideration of a quantized point cloud. The method of generating a global motion matrix based on a quantization coefficient is a method for correcting the inaccuracy of the global motion matrix based on the quantization coefficient that was used at the time of quantizing the point cloud, and may be represented as shown in Equation (1) below:

$$GM'=\text{round}(GM*2^{bits}*qs*\delta)/(2^{bits}*qs*\delta) \qquad (1)$$

Here, GM denotes a global motion matrix, qs denotes a quantization coefficient, bits denotes the number of bits used for compression, and δ denotes a correction coefficient. When a global motion matrix is corrected as shown in Equation (1), the inaccuracy of the global motion matrix can be controlled using the quantization coefficient and the correction coefficient δ whereby the efficiency of compression of the global motion in the quantized point cloud may be maximized.

Particularly, the correction coefficient δ may be acquired experimentally or in consideration of the characteristics of the global motion matrix, and because it may be applied differently depending on the value of the global motion matrix, the value of the global motion matrix may be adaptively corrected.

The step (S240) of applying the global motion matrix is the step of compensating for motion by applying the generated global motion matrix to the point cloud. Because global motion occurring in a LiDAR-based point cloud appears differently depending on the objects in the point cloud, the conventional global motion matrix application method is performed by identifying the objects in the point cloud. However, the conventional method may cause a difference in compression efficiency depending on the compression conditions.

For example, when a global motion matrix is applied using the conventional method, application of the global motion matrix is determined depending on the characteristics of objects, and objects to which the global motion matrix is applied and objects to which the global motion matrix is not applied are produced. When only global motion compression is performed, because a global motion matrix is not applied to an object in which global motion does not appear, high compression efficiency is obtained, but when local motion compression is performed, there is a limitation on the extent to which compression efficiency can be increased because the number of points available for local motion compression is limited. Therefore, a method for varying application of a global motion matrix depending on compression conditions is required.

Accordingly, a global motion matrix may be applied differently depending on the global and local motion compression conditions in an embodiment of the present invention.

Figure 3:
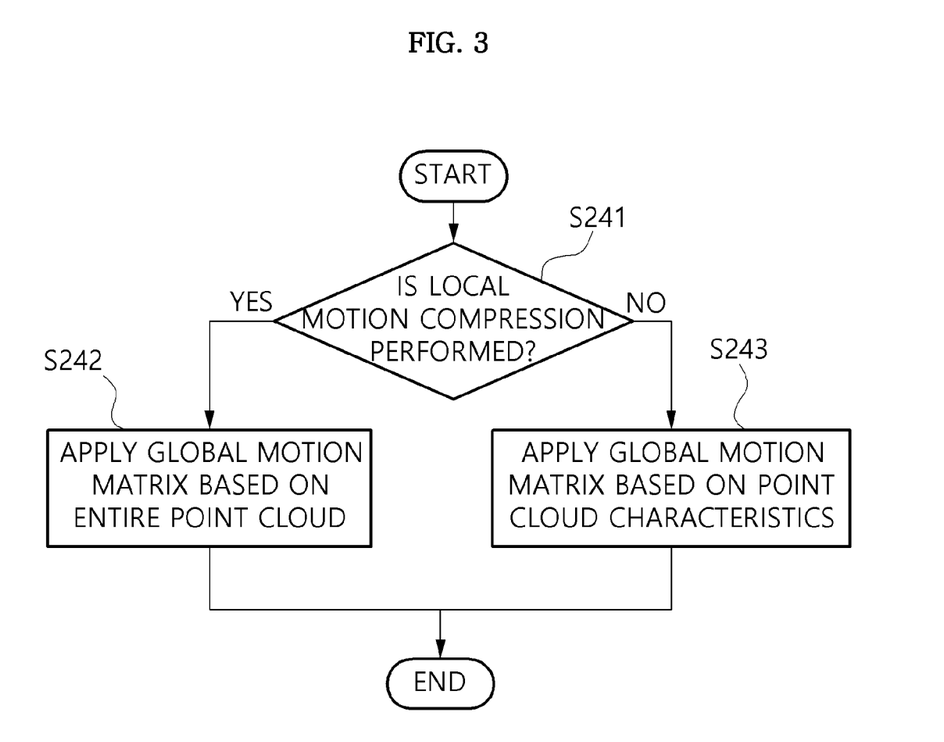
FIG. 3 is a flowchart illustrating a method for applying a global motion matrix based on global and local motion compression conditions.

FIG. 3 is a flowchart illustrating a method for applying a global motion matrix based on global and local motion compression conditions.

Referring to FIG. 3, it can be seen that the point cloud compression method according to an embodiment of the present invention changes the global motion matrix application method depending on whether local motion compression is performed.

That is, in the point cloud compression method according to an embodiment of the present invention, whether local motion compression is performed is determined at step S241, application of a global motion matrix based on the entire point cloud is performed at step S242 under compression conditions in which local motion compression is performed, and application of a global motion matrix based on the characteristics of the point cloud is performed at step S243 when local motion compression is not performed.

Here, application of the global motion matrix based on the entire point cloud at step S242 is a method of applying the same global motion matrix to all points in the input point cloud, and may be represented as shown in Equation (2) below:

$$PC_c[i] = GM' * PC[i] \quad (2)$$

In Equation (2) above, GM' denotes a corrected global motion matrix, PC denotes an input point cloud, and $PC_c$ denotes the compensated point cloud.

Application of the global motion matrix based on the characteristics of the point cloud at step S243 is a method of applying the global motion matrix using points in which global motion appears and point cloud segmentation information, which is acquired when a global motion search based on point cloud characteristics is performed, and may be represented as shown in Equation (3) below:

$$PC_c[i] = \begin{cases} GM' * PC[i], & PC[i] \in Obj_G \\ PC[i], & PC[i] \in Obj_{non} \end{cases} \quad (3)$$

In Equation (3) above, $Obj_{non}$ may be an object in which global motion characteristics do not appear, and $Obj_G$ may be an object in which global motion characteristics appear. This may be performed by changing compensation of a point in the input point cloud depending on whether the point pertains to an object in which global motion characteristics appear or an object in which global motion characteristics do not appear, whereby the efficiency of global motion compression may be maximized.

At the step (S250) of compressing local motion, local motion of the point cloud is searched for and compressed. The method of compressing the local motion of the point cloud may use G-PCC technology or various other methods that have been developed.

At the step (S260) of performing geometric compression, the point cloud is transformed into geometric information, and the geometric information is processed in order to improve compression efficiency at the step of performing arithmetic compression. Also, at the step of performing geometric compression, context information, which is to be used when arithmetic compression is performed, is generated using the geometric information along with the compressed information acquired at the steps of compressing global motion and local motion. Arithmetic compression may be performed using G-PCC technology or various other methods that have been developed.

At the step (S270) of performing arithmetic compression, lossless compression is performed on the context information and the geometric information, which are generated at the step of performing geometric compression, and on the motion information, which is generated at the steps of compressing global motion and local motion. Arithmetic compression may be performed using Context-based Adaptive Binary Arithmetic Coding (CABAC) or various other methods that have been developed.

At the step (S280) of restoring a point cloud, the compressed point cloud is restored in the manner opposite the manner of compressing the point cloud, whereby the point cloud is reconstructed from the compressed bitstream.

Figure 4:
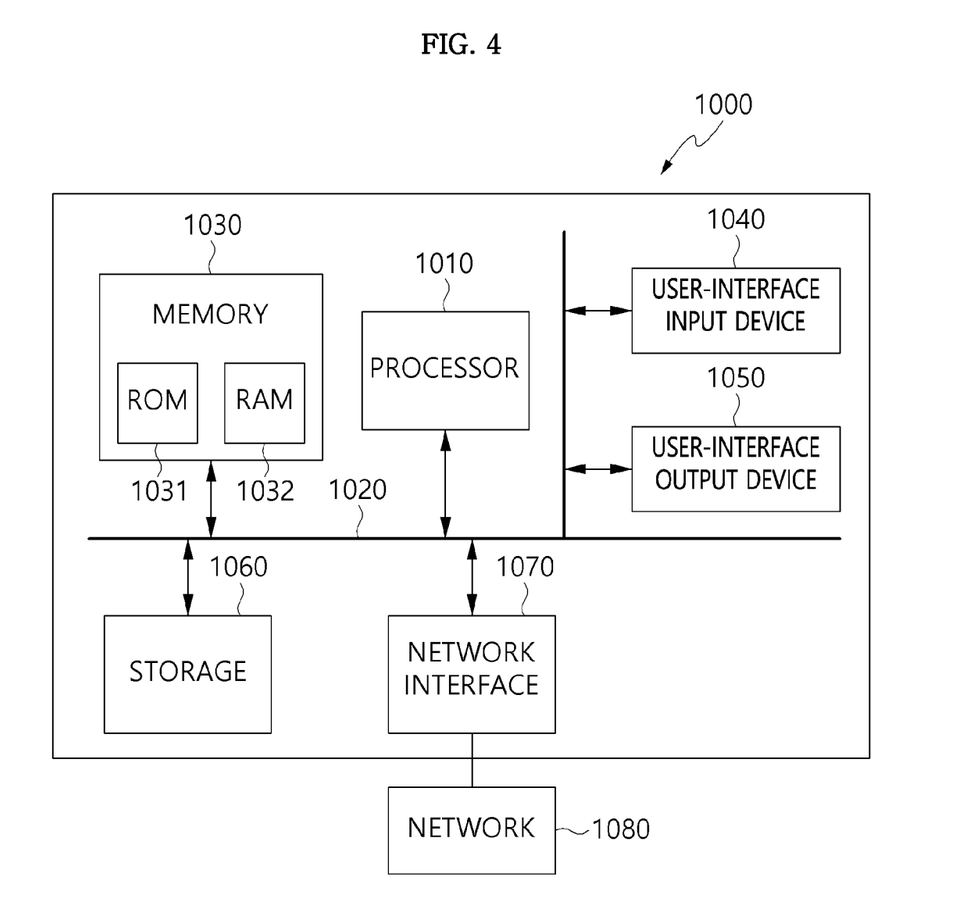
FIG. 4 is a view illustrating the configuration of a computer system according to an embodiment.

FIG. 4 is a view illustrating the configuration of a computer system according to an embodiment.

The apparatus for compressing point cloud data according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

The apparatus for compressing point cloud data according to an embodiment of the present invention includes memory 1030 in which at least one program is recorded and a processor 1110 for executing the program. The program includes instructions for performing the steps of quantizing input point cloud data, generating a global motion matrix based on the quantized point cloud data, applying the global motion matrix based on whether local motion compression is performed, and compressing the data to which the global motion matrix is applied.

Here, generating the global motion matrix may include correcting the global motion matrix based on the quantization coefficient that is applied to the input point cloud data.

Here, applying the global motion matrix may comprise applying the global motion matrix to all of the input point cloud data when local motion compression is performed.

Here, applying the global motion matrix may comprise, when local motion compression is not performed, applying the global motion matrix to points in the input point cloud data differently depending on whether global motion characteristics are present.

Here, applying the global motion matrix may comprise applying the global motion matrix to points exhibiting global motion characteristics in the input point cloud data.

Here, correcting the global motion matrix may comprise correcting the global motion matrix using the quantization coefficient and a correction coefficient.

The correction coefficient may be set differently depending on the value of the global motion matrix.

Here, compressing the data may include local motion compression, geometric compression, and arithmetic compression.

According to the present invention, point cloud content may be effectively compressed by changing the global motion matrix application method depending on whether local motion compression is used.

Also, the present invention may provide a global motion search method and a global motion matrix generation method that are suitable for a quantized point cloud.

Specific implementations described in the present invention are embodiments and are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. A method for compressing point cloud data, performed by an apparatus for compressing point cloud data, comprising:
   quantizing input point cloud data;
   generating a global motion matrix based on the quantized point cloud data;
   applying the global motion matrix based on whether local motion compression is performed; and
   compressing data to which the global motion matrix is applied,
   wherein generating the global motion matrix includes correcting the global motion matrix based on a quantization coefficient applied to the input point cloud data.

2. The method of claim 1, wherein applying the global motion matrix comprises, when local motion compression is performed, applying the global motion matrix to all of the input point cloud data.

3. The method of claim 2, wherein applying the global motion matrix comprises, when local motion compression is not performed, applying the global motion matrix to points in the input point cloud data differently depending on whether global motion characteristics are present.

4. The method of claim 3, wherein applying the global motion matrix comprises applying the global motion matrix to points in which global motion characteristics are present in the input point cloud data.

5. The method of claim 1, wherein correcting the global motion matrix comprises correcting the global motion matrix using the quantization coefficient and a correction coefficient.

6. The method of claim 5, wherein the correction coefficient is set differently depending on a value of the global motion matrix.

7. The method of claim 1, wherein compressing the data includes performing local motion compression, geometric compression, and arithmetic compression.

8. An apparatus for compressing point cloud data, comprising:
   memory in which at least one program is recorded; and
   a processor for executing the program,
   wherein the program includes instructions for performing
   quantizing input point cloud data;
   generating a global motion matrix based on the quantized point cloud data;
   applying the global motion matrix based on whether local motion compression is performed; and
   compressing data to which the global motion matrix is applied,
   wherein generating the global motion matrix includes correcting the global motion matrix based on a quantization coefficient applied to the input point cloud data.

9. The apparatus of claim 8, wherein applying the global motion matrix comprises, when local motion compression is performed, applying the global motion matrix to all of the input point cloud data.

10. The apparatus of claim 9, wherein applying the global motion matrix comprises, when local motion compression is not performed, applying the global motion matrix to points in the input point cloud data differently depending on whether global motion characteristics are present.

11. The apparatus of claim 10, wherein applying the global motion matrix comprises applying the global motion matrix to points in which global motion characteristics are present in the input point cloud data.

12. The apparatus of claim 8, wherein correcting the global motion matrix comprises correcting the global motion matrix using the quantization coefficient and a correction coefficient.

13. The apparatus of claim 12, wherein the correction coefficient is set differently depending on a value of the global motion matrix.

14. The apparatus of claim 8, wherein compressing the data includes performing local motion compression, geometric compression, and arithmetic compression.

* * * * *